United States Patent
Zhang

(10) Patent No.: US 11,650,896 B2
(45) Date of Patent: May 16, 2023

(54) METHOD AND A DEVICE FOR PROCESSING FREQUENCY CONVERTER MONITORING DATA AND A STORAGE MEDIUM

(71) Applicant: Siemens Aktiengesellschaft, Munich (DE)

(72) Inventor: Jing Wei Zhang, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 142 days.

(21) Appl. No.: 16/968,647

(22) PCT Filed: Feb. 12, 2019

(86) PCT No.: PCT/EP2019/053423
§ 371 (c)(1),
(2) Date: Aug. 10, 2020

(87) PCT Pub. No.: WO2019/155080
PCT Pub. Date: Aug. 15, 2019

(65) Prior Publication Data
US 2020/0401493 A1    Dec. 24, 2020

(30) Foreign Application Priority Data
Feb. 12, 2018   (CN) ...................... 2018 1 0146309.X

(51) Int. Cl.
*G06F 11/30*   (2006.01)
*G06F 16/16*   (2019.01)
(Continued)

(52) U.S. Cl.
CPC .......... *G06F 11/3065* (2013.01); *G06F 8/427* (2013.01); *G06F 9/44568* (2013.01);
(Continued)

(58) Field of Classification Search
CPC ............ G06F 11/3062; G06F 11/3414; G06F 11/3476; G06F 17/40
See application file for complete search history.

(56) References Cited

U.S. PATENT DOCUMENTS

| 9,015,666 | B2* | 4/2015 | Clark | .................. | G06F 11/3672 |
| | | | | | 717/123 |
| 2008/0086543 | A1* | 4/2008 | Carpenter | .............. | G06Q 10/10 |
| | | | | | 709/219 |

(Continued)

FOREIGN PATENT DOCUMENTS

| CN | 101287266 A | 10/2008 |
| CN | 101598766 A | 12/2009 |

(Continued)

OTHER PUBLICATIONS

Chinese Office Action dated Jan. 20, 2021.
International Search Report and Written Opinion dated Apr. 25, 2019.

*Primary Examiner* — Barbara B Anyan
(74) *Attorney, Agent, or Firm* — Harness, Dickey & Pierce, P.L.C.

(57) ABSTRACT

Embodiments disclose a method and a device for processing frequency converter monitoring data and a storage medium. An embodiment of the method includes: acquiring a script file containing a monitoring parameter specifying field and a storage location; parsing the script file to acquire the storage location and the monitoring parameter specifying field and determining the monitoring parameter specified by the monitoring parameter specifying field; collecting the monitoring data corresponding to the monitoring parameter; and storing the monitoring data in the storage location. The embodiments provide a script file based processing solution for frequency converter monitoring data, without no special tracking or debugging software tool required. Thus, the (Continued)

implementation complexity is reduced and the service cost and time are saved.

15 Claims, 5 Drawing Sheets

(51) Int. Cl.
    *G06F 8/41*         (2018.01)
    *G06F 9/445*      (2018.01)
    *G06F 11/36*      (2006.01)
    *G06F 21/53*      (2013.01)
    *G06F 21/57*      (2013.01)

(52) U.S. Cl.
    CPC ...... *G06F 11/3013* (2013.01); *G06F 11/3604* (2013.01); *G06F 11/3644* (2013.01); *G06F 16/164* (2019.01); *G06F 21/53* (2013.01); *G06F 21/575* (2013.01)

(56) References Cited

U.S. PATENT DOCUMENTS

| | | | |
|---|---|---|---|
| 2008/0141118 A1* | 6/2008 | Arkhipov | G06F 11/3644 715/241 |
| 2011/0078108 A1 | 3/2011 | Kumar | |
| 2012/0174086 A1* | 7/2012 | Raju | G06F 8/65 717/168 |
| 2016/0246312 A1* | 8/2016 | Toddy | G05B 15/02 |
| 2017/0017295 A1* | 1/2017 | McPherson | G06F 11/3414 |
| 2017/0118339 A1* | 4/2017 | Watson | H04M 3/42221 |
| 2017/0185774 A1* | 6/2017 | Sahita | G06F 21/53 |
| 2017/0371756 A1* | 12/2017 | Hanson | G06F 11/3013 |
| 2018/0011474 A1 | 1/2018 | Brinkhaus | |
| 2019/0065533 A1* | 2/2019 | Pulaski | G06F 9/4881 |
| 2019/0089545 A1* | 3/2019 | Dias Correa | G06F 21/575 |
| 2019/0180036 A1* | 6/2019 | Shukla | G06F 11/3604 |

FOREIGN PATENT DOCUMENTS

| | | |
|---|---|---|
| CN | 103558473 A | 2/2014 |
| CN | 104536398 A | 4/2015 |
| CN | 105704487 A | 6/2016 |
| CN | 105827541 A | 8/2016 |
| CN | 106970280 A | 7/2017 |
| CN | 107209496 A | 9/2017 |
| WO | WO 2009139994 A2 | 11/2009 |
| WO | WO 2014025584 A1 | 2/2014 |

* cited by examiner

METHOD AND A DEVICE FOR PROCESSING FREQUENCY CONVERTER MONITORING DATA AND A STORAGE MEDIUM

PRIORITY STATEMENT

This application is the national phase under 35 U.S.C. § 371 of PCT International Application No. PCT/EP2019/053423 which has an International filing date of Feb. 12, 2019, which designated the United States of America and which claims priority to Chinese patent application number 201810146309.X filed Feb. 12, 2018, the entire contents of which are hereby incorporated herein by reference.

FIELD

Embodiments of the present application generally to the technical field of frequency converters, and in particular relate to a method and a device for processing frequency converter monitoring data and a storage medium.

BACKGROUND

The frequency converter is an electrical apparatus which changes the voltage, frequency, number of phases, and quantity of electrical charges or characteristics of a power supply system. The frequency converter usually comprises a rectifying unit used to convert AC to DC, a DC-link unit used for decoupling and filtering, and an inverter used to convert DC to AC. The power conversion function of the frequency converter is realized through a specific circuit topology formed by power semiconductor devices. The parameters of the frequency converter often need to be monitored to learn the working performance of the frequency converter.

The tracking function is very helpful for monitoring and diagnosing the frequency converter on site. Currently, the frequency converter is usually connected to a debugging host, and a special debugging tool, for example, SINAMICS V90 V or SINAMICS S I 20 Starter, is run on the debugging host to track the frequency converter. However, it is difficult for the users to master these complicated debugging tools.

In addition, the acquired monitoring data is usually stored in the internal buffer in the frequency converter at present. The storage space of the buffer in the frequency converter is very small (for example, only a few KB) and it is difficult to store long-time monitoring data.

SUMMARY

The embodiments of the present invention provide a method and a device for processing frequency converter monitoring data and a storage medium.

At least one example embodiment of the present invention is as follows:

A method for processing frequency converter monitoring data comprises:

acquiring a script file, the script file containing a monitoring parameter specifying field and a storage location; parsing the script file to acquire the storage location and the monitoring parameter specifying field and determining the monitoring parameter specified by the monitoring parameter specifying field;

collecting frequency converter monitoring data corresponding to the monitoring parameter and storing the frequency converter monitoring data in the storage location.

At least one other embodiment is directed to a device for processing frequency converter monitoring data comprises:

a script file acquiring module, used to acquire a script file, the script file containing a monitoring parameter specifying field and a storage location;

a parsing module, used to parse the script file to acquire the storage location and the monitoring parameter specifying field and determine the monitoring parameter specified by the monitoring parameter specifying field; a monitoring data storage module, used to collect the frequency converter monitoring data corresponding to the monitoring parameter and store the frequency converter monitoring data in the storage location.

At least one other embodiment is directed to a device for processing frequency converter monitoring data comprises: a processor and a memory;

applications, which can be executed by the processor to enable the processor to perform the steps of any of the above methods for processing frequency converter monitoring data, are stored in the memory.

At least one other embodiment is directed to a computer readable storage medium is provided, computer readable instructions are stored in the computer readable storage medium and the computer readable instructions are used to perform the steps of any of the embodiments of the methods of processing frequency converter monitoring data.

DESCRIPTION OF REFERENCE NUMERALS IN THE DRAWINGS

Figure 1:
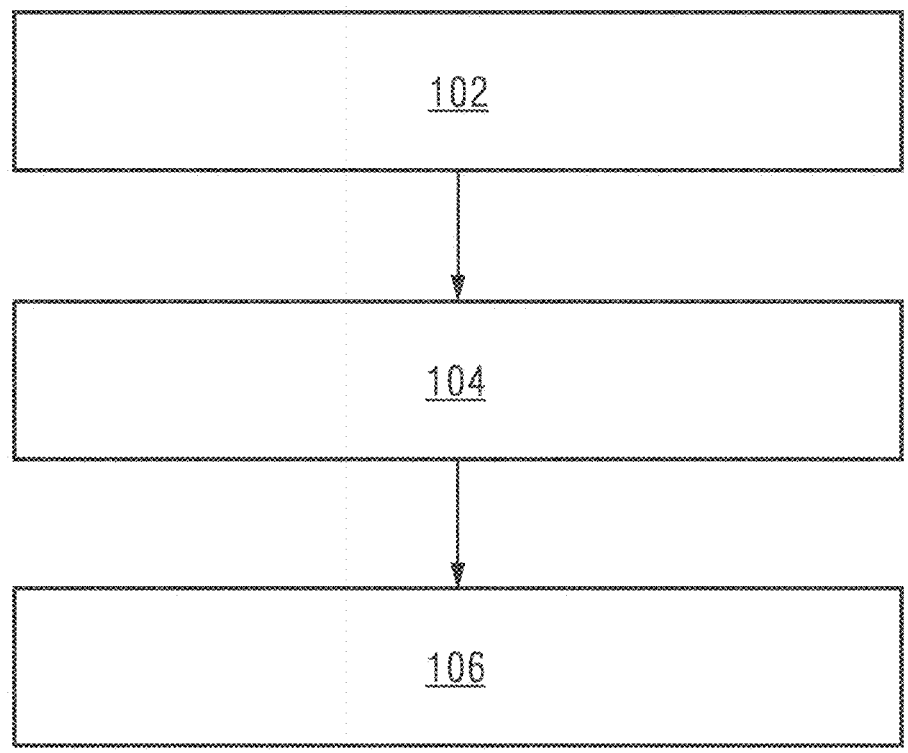
FIG. 1 is an example flowchart of the method for processing frequency converter monitoring data in the embodiments of the present invention.

| Reference numeral | Meaning |
| --- | --- |
| 102-106 | Steps |
| 200 | Device for processing frequency converter monitoring data |
| 201 | Script file acquiring module |
| 202 | Parsing module |
| 203 | Monitoring data storage module |
| 204 | Script storage module |
| 205 | Trigger condition setting module |
| 31 | SD card |
| 32 | SD card interface |
| 33 | Frequency converter |
| 20 | Cabinet |
| 21 | Rectifier component |
| 22 | Inverter and filter component |
| 400 | Device for processing frequency converter monitoring data |
| 401 | Processor, |
| 402 | Memory |

-continued

| Reference numeral | Meaning |
|---|---|
| 501 | Data area |
| 502 | Chart area |

DETAILED DESCRIPTION OF THE EXAMPLE EMBODIMENTS

A method for processing frequency converter monitoring data comprises:

acquiring a script file, the script file containing a monitoring parameter specifying field and a storage location; parsing the script file to acquire the storage location and the monitoring parameter specifying field and determining the monitoring parameter specified by the monitoring parameter specifying field;

collecting frequency converter monitoring data corresponding to the monitoring parameter and storing the frequency converter monitoring data in the storage location.

It can be seen that in the embodiments of the present invention, it is not necessary to connect the frequency converter to a debugging host or run a special debugging tool on the debugging host any longer, the collection and storage of monitoring data can be realized through a script file, and thus the implementation complexity is reduced and the service cost and time are saved.

In one embodiment, the script file further contains a storage file format and the method further comprises parsing the script file to acquire the storage file format;

the step of storing the frequency converter monitoring data in the storage location comprises: creating a storage file corresponding to the storage file format in the storage location; writing the frequency converter monitoring data in the storage file.

It can be seen that a storage file format can be specified in the script file in the embodiments of the present invention so that frequency converter monitoring data can be written in the specified storage file format to facilitate file management and subsequent secondary development.

In one embodiment, the storage file format is a comma-separated values file format or text file format.

Therefore, frequency converter monitoring data is stored on the basis of the comma-separated values file format or text file format in the embodiments of the present invention so that various graphics files can be developed.

In one embodiment, the storage location is in a secure digital card connected to the secure digital card interface of the frequency converter or in a multimedia card connected to the multimedia card interface of the frequency converter.

It can be seen that frequency converter monitoring data is stored in a secure digital card or a multimedia card of the frequency converter, instead of the internal buffer, and thus the file storage space is significantly increased and the recording time can also be significantly increased.

In one embodiment, the method further comprises storing an autorun file and the script file in a secure digital card connected to the secure digital card interface of the frequency converter or in a multimedia card connected to the multimedia card interface of the frequency converter, the autorun file containing an invoking function for the script file; the step of acquiring a script file comprises:

automatically running the autorun file and acquiring the script file from the secure digital card or the multimedia card based on the invoking function.

It can be seen that automatic script file acquisition and parsing and data processing are realized by setting an autorun file and a script file in a secure digital card or multimedia card of the frequency converter, and thus the automation efficiency is improved.

In one embodiment, the monitoring parameter specifying field contains a monitoring parameter identifier, and the step of determining the monitoring parameter specified by the monitoring parameter specifying field comprises: determining the corresponding monitoring parameter of the monitoring parameter identifier as the monitoring parameter specified by the monitoring parameter specifying field; or the monitoring parameter specifying field contains a frequency converter storage address interval and the step of determining the monitoring parameter specified by the monitoring parameter specifying field comprises: determining the monitoring parameter in the frequency converter storage address interval as the monitoring parameter specified by the monitoring parameter specifying field.

It can be seen that the monitoring parameter specifying field in the embodiments of the present invention can statically specify a specific monitoring parameter or non-statically specify a monitor parameter in the frequency converter storage address interval, and thus there are a plurality of applicable modes.

In one embodiment, the method further comprises: setting a start triggering condition and an end triggering condition;

the step of parsing a script file is parsing the script file when the start triggering condition is satisfied; the method further comprises: stopping storing the frequency converter monitoring data in the storage location when the end triggering condition is satisfied.

It can be seen that start triggering for the script file parsing action and stop triggering for the data storage action are respectively realized by setting the start triggering condition and the end triggering condition and a controlled data monitoring mode is realized in the embodiments of the present invention.

At least one other embodiment is directed to a device for processing frequency converter monitoring data comprises:

a script file acquiring module, used to acquire a script file, the script file containing a monitoring parameter specifying field and a storage location;

a parsing module, used to parse the script file to acquire the storage location and the monitoring parameter specifying field and determine the monitoring parameter specified by the monitoring parameter specifying field; a monitoring data storage module, used to collect the frequency converter monitoring data corresponding to the monitoring parameter and store the frequency converter monitoring data in the storage location.

It can be seen that in the embodiments of the present invention, it is not necessary to connect the frequency converter to a debugging host or run a special debugging tool on the debugging host any longer, the collection and storage of monitoring data can be realized through a script file, and thus the implementation complexity is reduced and the service cost and time are saved.

In one embodiment, the script file further contains a storage file format;

the parsing module is further used to parse the script file to acquire the storage file format;

the monitoring data storage module is used to create a storage file corresponding to the storage file format in the storage location and write the frequency converter monitoring data in the storage file.

It can be seen that a storage file format can be specified in the script file in the embodiments of the present invention so that frequency converter monitoring data can be written in the specified storage file format to facilitate file management and subsequent secondary development.

In one embodiment, the storage file format is a comma-separated values file format or text file format. Therefore, frequency converter monitoring data is stored on the basis of the comma-separated values file format or text file format in the embodiments of the present invention so that various graphics files can be developed.

In one embodiment, the storage location is in a secure digital card connected to the secure digital card interface of the frequency converter or in a multimedia card connected to the multimedia card interface of the frequency converter.

It can be seen that frequency converter monitoring data is stored in a secure digital card or a multimedia card of the frequency converter, instead of the internal buffer, and thus the file storage space is significantly increased and the recording time can also be significantly increased.

In one embodiment, the device for processing frequency converter monitoring data further comprises:

a script storage module, used to store an autorun file and the script file in a secure digital card connected to the secure digital card interface of the frequency converter or in a multimedia card connected to the multimedia card interface of the frequency converter, the autorun file containing an invoking function for the script file; the script file acquiring module, used to automatically run the autorun file and acquire the script file from the secure digital card or the multimedia card based on the invoking function.

It can be seen that automatic script file acquisition and parsing and data processing are realized by setting an autorun file and a script file in a secure digital card or multimedia card of the frequency converter, and thus the automation efficiency is improved.

In one embodiment, the monitoring parameter specifying field contains a monitoring parameter identifier and the parsing module is used to determine the corresponding monitoring parameter of the monitoring parameter identifier as the monitoring parameter specified by the monitoring parameter specifying field; or the monitoring parameter specifying field contains a frequency converter storage address interval and the parsing module is used to determine the monitoring parameter in the frequency converter storage address interval as the monitoring parameter specified by the monitoring parameter specifying field.

It can be seen that the monitoring parameter specifying field in the embodiments of the present invention can statically specify a specific monitoring parameter or non-statically specify a monitor parameter in the frequency converter storage address interval, and thus there are a plurality of applicable modes.

In one embodiment, the device further comprises a trigger condition setting module, used to set a start triggering condition and an end triggering condition;

the parsing module, used to parse the script file when the start triggering condition is satisfied;

the monitoring data storage module, used to stop storing the frequency converter monitoring data in the storage location when the end triggering condition is satisfied.

It can be seen that start triggering for the script file parsing action and stop triggering for the data storage action are respectively realized by setting the start triggering condition and the end triggering condition and a controlled data monitoring mode is realized in the embodiments of the present invention.

At least one other embodiment is directed to a device for processing frequency converter monitoring data comprises: a processor and a memory;

applications, which can be executed by the processor to enable the processor to perform the steps of any of the above methods for processing frequency converter monitoring data, are stored in the memory.

Therefore, the embodiments of the present invention further realizes a device for processing frequency converter monitoring data based on the processor-memory architecture, and the processor can execute the steps of the method for processing frequency converter monitoring data.

At least one other embodiment is directed to a computer readable storage medium is provided, computer readable instructions are stored in the computer readable storage medium and the computer readable instructions are used to perform the steps of any of the embodiments of the methods of processing frequency converter monitoring data.

Therefore, the embodiments of the present invention further realize a computer readable storage medium and computer readable instructions stored in the computer readable storage medium can execute the steps of the method for processing frequency converter monitoring data.

To make clearer the technical solution and advantages of the present invention, the following further describes in detail the present invention in combination with the drawings and embodiments. It should be understood that the specific embodiments described here are used only to illustrate the present invention, but not restrict the scope of protection of the present invention.

For the purposes of simplicity and intuitiveness of the description, the following gives some representative embodiments to illustrate the present invention. A large amount of details in the embodiments are only used to help to understand the solution of the present invention. Obviously, the technical solution of the present invention is not limited to these details, however. To avoid unnecessarily making the solution of the present invention confused, some embodiments are not described in detail, but only their frameworks are given. Below, the term "comprise" refers to "including but not limited to" and the term "according to . . . " refers to "at least according to . . . , but not limited to only according to . . . " In view of the codes of the language of Chinese, the number of a component hereinafter can be one or more or can even be understood as at least one, unless otherwise specified.

In view of many defects of frequency inverter monitoring data acquisition by connecting a frequency inverter to a debugging host and running a special debugging tool on the debugging host in the prior art, the embodiments of the present invention provide a script file based processing solution for frequency converter monitoring data, and the processing solution reduces the implementation complexity significantly.

FIG. 1 is an example flowchart of the method for processing frequency converter monitoring data in the embodiments of the present invention.

As shown in FIG. 1, the method comprises:

Step 102: Acquire a script file. The script file contains a monitoring parameter specifying field and a storage location.

In one embodiment, the script file can be stored in advance in a secure digital (SD) card connected to the SD card interface of the frequency converter. The frequency converter can acquire the script file from the SD card based on autorun mode. In particular, the autorun file and the script file can be stored in the SD card and the autorun file contains an invoking function for the script file. In particular, the script file can be compiled in various languages, such as LUA, Java, and VB. For example, if the script file is compiled in LUA and the script file is named utils. lua, then the invoking function dofile ("/rom/utils.lua") is embedded in the autorun file so as to realize the invocation of the script file from the SD card.

In one embodiment, the script file can be stored in advance in a multimedia card (MMC) connected to the MMC interface of the frequency converter. The frequency converter can acquire the script file from the MMC based on autorun mode. In particular, the autorun file and the script file are stored in the MMC and the autorun file contains an invoking function for the script file. In particular, the script file can be compiled in various languages, such as LUA, Java, and VB. For example, if the script file is compiled in LUA and the script file is named utils. lua, then the invoking function dofile ("/rom/utils.lua") is embedded in the autorun file so as to realize the invocation of the script file from the MMC.

The monitoring parameter specifying field contained in the script file is used to specify monitoring parameters. In particular, monitoring parameters can include DC-link voltage, output current, and over-current alarm current, for example. The storage location contained in the script file is used to specify the storage location of the monitoring data corresponding to the monitoring parameters.

Preferably, the storage location contained in the script file is in the SD card connected to the SD card interface of the frequency converter. The SD card specified by the storage location contained in the script file can be the same as the SD card in which the script file is stored or can be different from the SD card in which the script file is stored.

Preferably, the storage location contained in the script file is in the MMC connected to the MMC interface of the frequency converter. The MMC specified by the storage location contained in the script file can be the same as the MMC in which the script file is stored or can be different from the MMC in which the script file is stored.

Step 104: Parse the script file to acquire the storage location and the monitoring parameter specifying field and determine the monitoring parameter specified by the monitoring parameter specifying field.

Here, the script editor in the frequency converter particularly parses the script file. In fact, a script editor is in advance built in frequency converters which are widely applied at present, and therefore, the script editor which is built in the frequency converter in advance can be used to parse the script file. When no script editor is built in the frequency converter in advance, a script editor can be provided in the frequency converter.

In one embodiment, the monitoring parameter specifying field contains a monitoring parameter identifier, and determining the monitoring parameter specified by the monitoring parameter specifying field in Step 104 comprises: determining the corresponding monitoring parameter of the monitoring parameter identifier as the monitoring parameter specified by the monitoring parameter specifying field. In this embodiment, a monitoring parameter identifier is clearly specified in the monitoring parameter specifying field and thus the frequency converter can definitely determine the monitoring parameter to be monitored.

In one embodiment, the monitoring parameter specifying field contains a frequency converter storage address interval, and determining the monitoring parameter specified by the monitoring parameter specifying field in Step 104 comprises: determining the monitoring parameter in the frequency converter storage address interval as the monitoring parameter specified by the monitoring parameter specifying field.

In this embodiment, no monitoring parameter identifier is clearly specified in the monitoring parameter specifying field, and the frequency converter storage address interval is specified, instead. The frequency converter can determine all monitoring parameters in the frequency converter storage address interval as monitoring parameters to be monitored.

Step 106: Collect the monitoring data corresponding to the monitoring parameter and store the monitoring data in the storage location.

Here, the frequency converter can continuously collect the monitoring data corresponding to the monitoring parameters and store the monitoring data in the storage location after determining the monitoring parameters. For the specific mechanism of the frequency converter collecting the monitoring data corresponding to the monitoring parameters, refer to the monitoring technique in the prior art. The mechanism will not be described in the embodiments of the present invention.

It can be seen that since the storage location of monitoring data is not limited to the buffer in the frequency converter and monitoring data can be stored in the storage location in various storage cards connected to the frequency converter in the embodiments of the present invention, a large amount of monitoring data can be saved and massive analytical data can be provided. For example, more than 600 MB of monitoring data can be written in an MMC or SD card and the data can be recorded for more than 4 hours in the embodiments of the present invention.

Preferably, monitoring data in the MMC or SD card can be sent over a network back to the service mailbox for specific data analysis. In addition, the script file is preferably editable. Engineers can change monitoring parameters and the storage location by changing the script file.

In one embodiment, the script file further contains a storage file format; Step 104 further comprises: the script editor parsing the script file to acquire the storage file format; storing monitoring data in the storage location in Step 106 comprises: creating a storage file corresponding to the storage file format in the storage location; writing monitoring data in the storage file.

Preferably, the storage file format is a comma-separated values (CSV) file format or text (TXT) file format.

Typical instances of script languages and storage file formats are exemplarily described above. Those skilled in the art can know that the description is only used for the example purpose, but not used to limit the scope of protection of the embodiments of the present invention.

In one embodiment, a start triggering condition and an end triggering condition are further set in the frequency converter.

Preferably, parsing a script file in Step 104 is parsing the script file when the start triggering condition is satisfied. For example, a start button can be set on the man-machine interface of the frequency converter, and when the start button is triggered, the start triggering condition is considered satisfied, and the frequency converter starts parsing the script file to acquire monitoring data. Again for example, a start timer can be set in the frequency converter, and when the preset time of the start timer expires, the start triggering condition is considered satisfied, the frequency converter starts parsing the script file starts to acquire monitoring data.

Preferably, the method further comprises stopping storing monitoring data in the storage location when the end triggering condition is satisfied. For example, a stop button can be set on the man-machine interface of the frequency converter, and when the stop button is triggered, the end triggering condition is considered satisfied, and the frequency converter stops acquiring monitoring data and stops storing monitoring data in the storage location. Again for example, an end timer can be set in the frequency converter, and when the preset time of the timer expires, the end triggering condition is considered satisfied, and the frequency converter stops acquiring monitoring data and stops storing monitoring data in the storage location. Again for example, a storage capacity threshold can be set, and when the size of stored monitoring data is greater than the storage capacity threshold, the end triggering condition is considered satisfied, and the frequency converter stops acquiring monitoring data and stops storing monitoring data in the storage location.

Typical instances of start triggering conditions and end triggering conditions are exemplarily described above. Those skilled in the art can know that the description is only used for the example purpose, but not used to limit the scope of protection of the embodiments of the present invention.

In the embodiments of the present invention, the amount of recorded monitoring data is not restricted by the buffer size (some KB) any longer, but only depends on the size of the storage card such as MMC or SD card. The storage level of current MMCs or SD cards is GB. Therefore, a very large amount of monitoring data can be recorded and the monitoring data can be recorded for a long time. In addition, monitoring data can be saved, in the CSV file format, for example, in the MMC or SD card, and monitoring data can be copied to a smart phone or office software for subsequent data processing, without special tracking or debugging software tool. In the embodiments of the present invention, monitoring data can be sent over a network to the service mailbox for analysis, and thus the service cost and service time are greatly saved.

In addition, the subsequent monitoring data analysis process is simple in the embodiments of the present invention. After plotting settings executed by office software, curves can be plotted on the basis of the monitoring data in the CSV file to help the user to intuitively learn the monitoring data.

On the basis of the description above, a device for tracking frequency converter monitoring data is further provided in the embodiments of the present invention.

Figure 2:
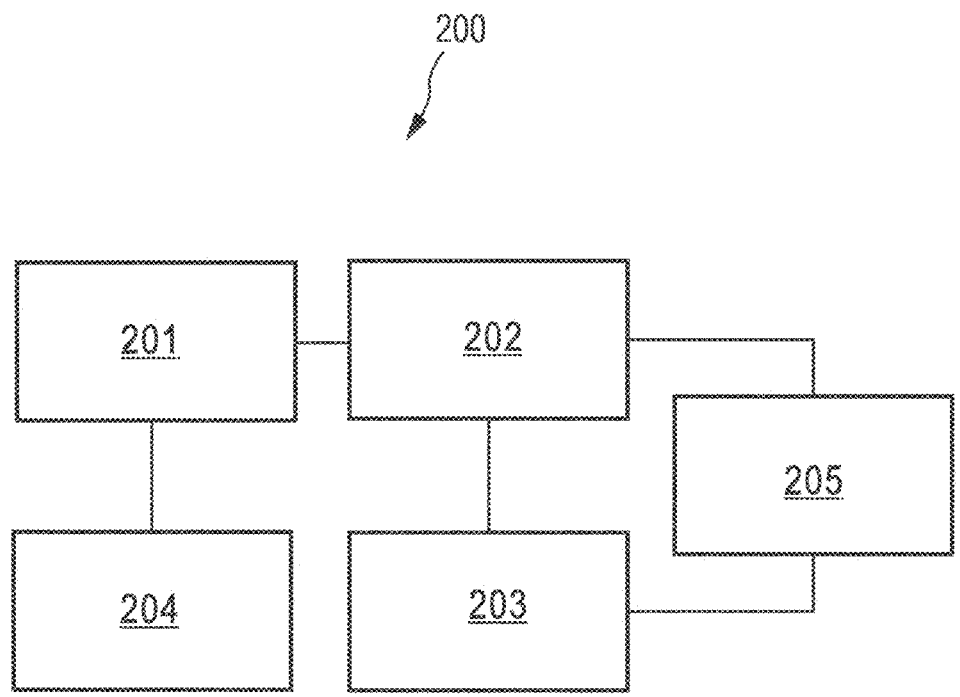
FIG. 2 is a diagram for the example structure of one device for processing frequency converter monitoring data in the embodiments of the present invention.

FIG. 2 is a diagram for the example structure of one device for processing frequency converter monitoring data in the embodiments of the present invention.

As shown in FIG. 2, the device 200 for processing frequency converter monitoring data comprises:

a script file acquiring module 201, used to acquire a script file, the script file containing a monitoring parameter specifying field and a storage location;

parsing module 202, used to parse the script file to acquire the storage location and the monitoring parameter specifying field and determine the monitoring parameter specified by the monitoring parameter specifying field; and a monitoring data storage module 203, used to collect the frequency converter monitoring data corresponding to the monitoring parameter and store monitoring data in the storage location.

In one embodiment, the script file further contains a storage file format; the parsing module 202 is further used to parse the script file to acquire the storage file format; the monitoring data storage module 203 is used to create a storage file corresponding to the storage file format in the storage location and write the frequency converter monitoring data in the storage file.

In one embodiment, the storage file format is a CSV format or TXT format.

In one embodiment, the storage location is in the SD card connected to the SD card interface of the frequency converter or MMC connected to the MMC interface of the frequency converter.

In one embodiment, the device for processing frequency converter monitoring data further comprises:

a script storage module 204, used to store an autorun file and the script file in an SD card connected to the SD card interface of the frequency converter or in an MMC connected to the MMC interface of the frequency converter, the autorun file containing an invoking function for the script file; a script file acquiring module 201, used to run the autorun file and acquire the script file from the SD card or MMC based on the invoking function.

In one embodiment, the monitoring parameter specifying field contains a monitoring parameter identifier, and the parsing module 202 is used to determine the corresponding monitoring parameter of the monitoring parameter identifier as the monitoring parameter specified by the monitoring parameter specifying field; or the monitoring parameter specifying field contains a frequency converter storage address interval and the parsing module 202 is used to determine the monitoring parameter in the frequency converter storage address interval as the monitoring parameter specified by the monitoring parameter specifying field.

In one embodiment, the device further comprises a trigger condition setting module 205, used to set a start triggering condition and an end triggering condition;

a parsing module 202, used to parse the script file when the start triggering condition is satisfied;

a monitoring data storage module 203, used to stop storing frequency converter monitoring data in the storage location when the end triggering condition is satisfied.

The following describes the present invention in combination with specific embodiments of the frequency converter.

Figure 3:
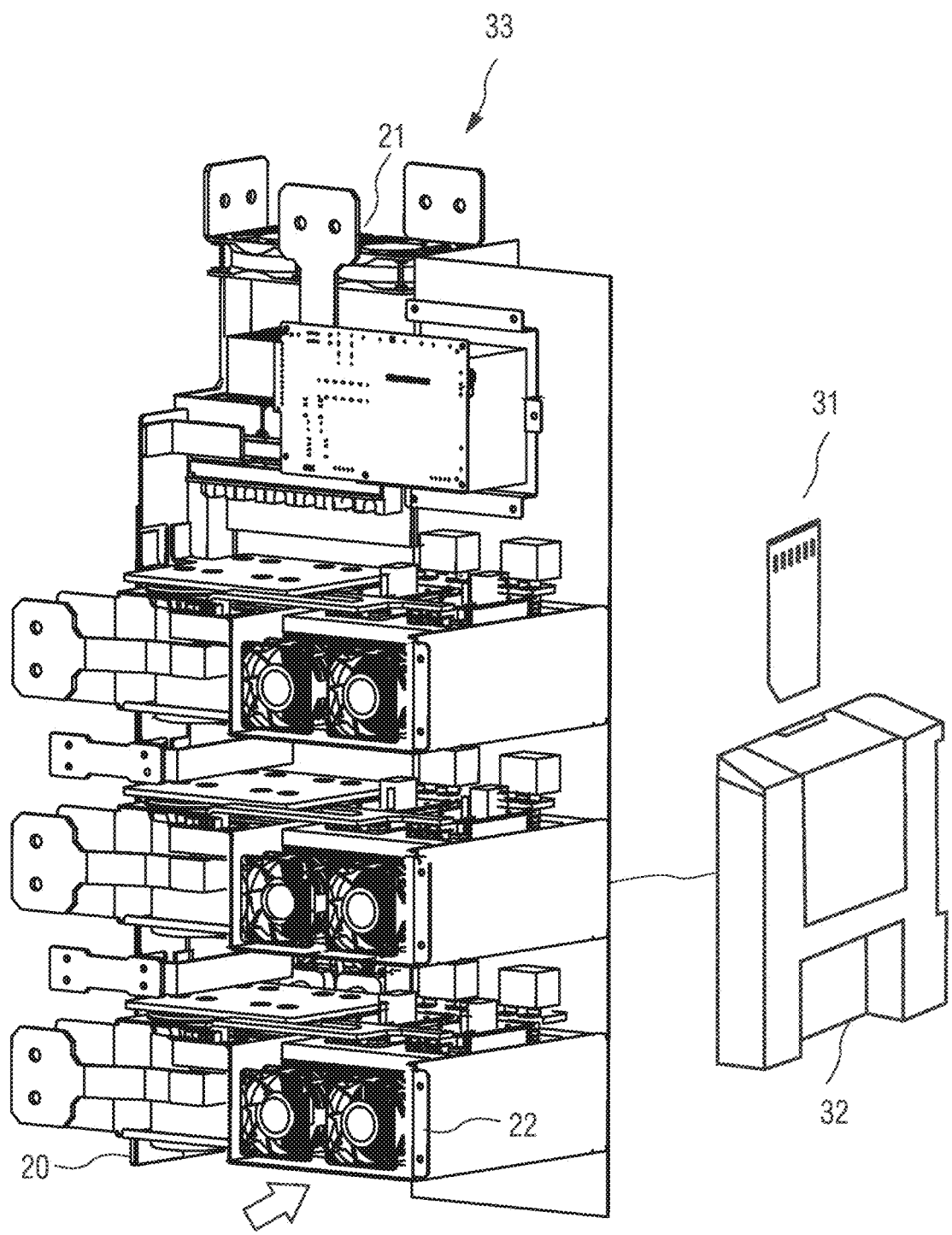
FIG. 3 is a schematic diagram for the acquisition of frequency converter monitoring data in the embodiments of the present invention.

FIG. 3 is a schematic diagram for the tracking of frequency converter monitoring data in the embodiments of the present invention.

In FIG. 3, the frequency converter 33 comprises a cabinet 20, rectifier components 21 arranged on one side in a first direction of the cabinet 20, inverter and filter components 22 arranged on the other side in the first direction of the cabinet 20; wherein the rectifier components 21 and the inverter and filter components 22 have mutually independent cooling air paths. The cabinet 20 has accommodation spaces, the rectifier components 21 are arranged in the accommodation space on one side of the cabinet 20 in the first direction, and the inverter and filter components 22 are arranged in the accommodation space on the other side of the cabinet 20 in the first direction. The rectifier components 21 are used to perform AC-DC conversion processing, and the inverter and filter components 22 are used to perform DC decoupling, filtering and DC-AC conversion processing. The frequency converter 33 further comprises a common conduct 23 which is extended in the first direction to pass through the air outlets of the cooling air paths of various inverter and filter components 22. The common duct 23 is used to gather the air flows after the air flows are used to cool the inverter and filter components 22.

The frequency converter 33 is connected to the SD card interface 32 with a cable. An SD card 31 is inserted in the SD card interface 32. The autorun file and script file which are edited in advance are stored in the SD card 31 and the autorun file contains an invoking function for the script file.

The script file contains a field which specifies the storage location as the SD card 31. The script file further contains the fields which specify the monitoring parameters including the output current of the inverter and filter components 22 and the input current of the rectifier components 21.

After finding that an autorun file exists in the SD card 31, the frequency converter 33 runs the autorun file to realize the invocation of the script file in the SD card. After the start button on the MMI of the frequency converter 33 is triggered, the script editor in the frequency converter 33 parses the script file to learn that the storage location is the SD card 31 and the monitoring parameters include the output current of the inverter and filter components 22 and the input current of the rectifier components 21. Then, the frequency converter 33 continuously collects the monitored value of the output current of the inverter and filter components 22 and the monitored value of the input current of the rectifier components 21, and continuously stores the monitored value of the output current of the inverter and filter components 22 and the monitored value of the input current of the rectifier components 21 in the SD card 31. When the size of the monitoring data stored is greater than the preset storage capacity threshold, the frequency converter 33 considers that the end triggering condition is satisfied, stops acquiring the monitored value of the output current of the inverter and filter components 22 and the monitored value of the input current of the rectifier components 21, and stops writing data in the SD card 31.

The above gives instances of the specific frequency converter structure and specific monitoring parameters to describe the embodiments of the present invention. Those skilled in the art can know that the description is only used for the example purpose, but not to restrict the scope of protection of the embodiments of the present invention.

On the basis of the description above, a processor-memory architecture based device for tracking frequency converter monitoring data is further provided in the embodiments of the present invention.

Figure 4:
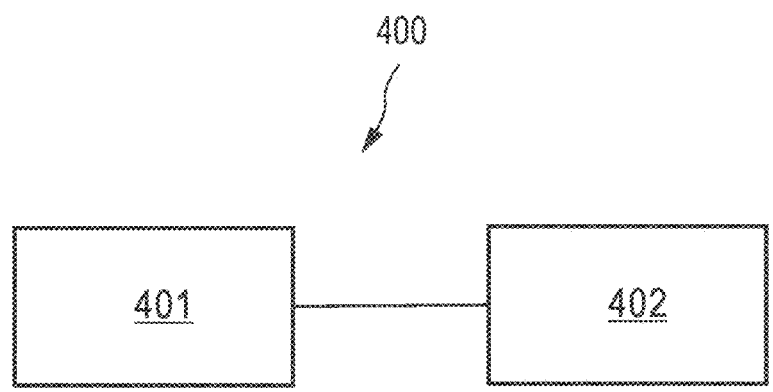
FIG. 4 is a diagram for the example structure of another device for processing frequency converter monitoring data in the embodiments of the present invention.

FIG. 4 is a diagram for the example structure of the tracking device for processing frequency converter monitoring data in the embodiments of the present invention.

As shown in FIG. 4, the device 400 for processing frequency converter monitoring data comprises: a processor 401 and a memory 402;
wherein applications, which can be executed by the processor 401 to enable the processor 401 to perform the steps of any of the above methods for processing frequency converter monitoring data, are stored in the memory 402.

Figure 5:
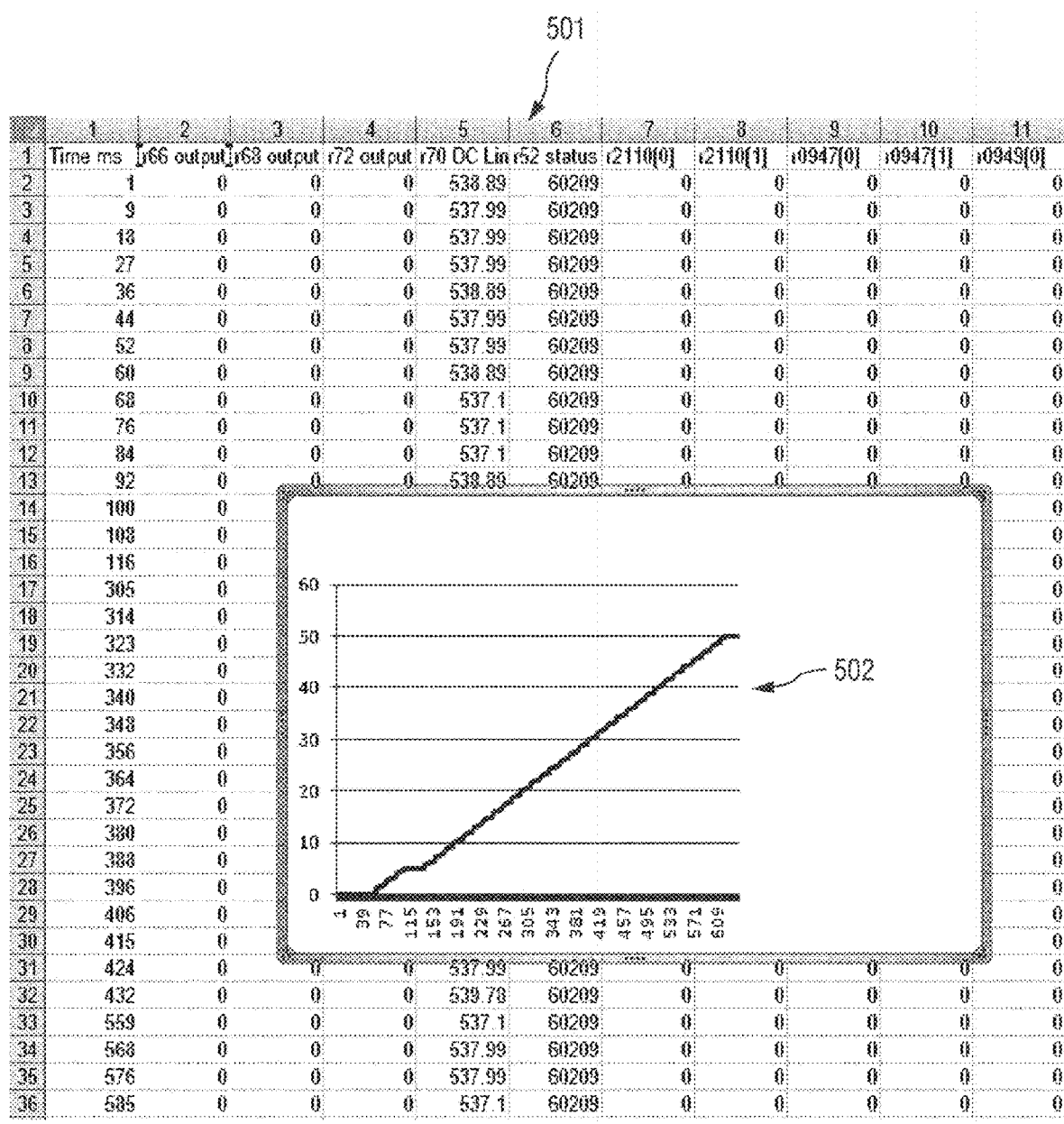
FIG. 5 is a schematic diagram for the stored monitoring data and secondary development in the embodiments of the present invention.

FIG. 5 is a schematic diagram for the stored monitoring data and secondary development in the embodiments of the present invention.

In FIG. 5, on the basis of the embodiments of the present invention, the monitoring data saved in the storage location is shown in the data area 501, and a large amount of monitoring data of a plurality of monitoring parameters is saved in the data area 501 in the CSV file format. Office software (for example, Microsoft EXCEL) can be used to plot data charts on the basis of the original data provided by the data area 501 to help the user to intuitively learn the monitoring data, as shown in the chart area 502.

It should be noted that not all steps or modules in the above-mentioned processes and structural diagrams are required, and some steps or modules can be ignored, depending on the actual requirements. The execution sequence of the steps is not fixed and can be adjusted as required. The partition of the modules is a functional partition for the convenience of description. In the practical implementation, the function of a module can be realized by a plurality of modules, and the functions of a plurality of modules can be realized by one module and these modules can be located in the same equipment or can be located in different equipment.

The hardware modules in different embodiments can mechanically or electronically be realized. For example, a hardware module can comprise specially designed permanent circuits or logic devices (for example, application-specific processors such as field programmable gate array (FPGA) or application specific integrated circuit (ASIC)) to complete specific operations. A hardware module can also comprise programmable logic devices or circuits (for example, general processors or other programmable processors) temporarily configured by software to perform specific operations. Whether a hardware module is realized mechanically, or by use of a dedicated permanent circuit or a temporarily configured circuit (for example, configured by software) can depend on the considerations of the cost and the time.

The present invention further provides a machine readable storage medium, in which instructions allowing a machine to execute the method described in this document are stored. In particular, a system or device equipped with a storage medium can be provided. Software program codes which can realize the function in any of above-mentioned embodiments are stored in the storage medium and the computer (or CPU or MPU) of the system or device can read and execute the program codes stored in the storage medium. In addition, through the instructions based on the program codes, the operating system on the computer can complete a part of or all the practical operations. In addition, the program codes read out of a storage medium can be written into the memory in the expansion board in a computer or can be written into a memory in an expansion unit connected to the computer, and then the instructions based on the program codes let the CPU installed on the expansion board or expansion unit execute a part or all of the practical operations to realize the function in any of the above-mentioned embodiments.

Storage media used to provide program codes include floppy disk, hard disk, magneto-optical disk, compact disk (for example, compact disk read-only memory (CD-ROM)), compact disk—recordable (CD-R), compact disk—rewritable (CD-RW), digital video disk—read only memory (DVD-ROM), digital versatile disk—random access memory (DVD-RAM), digital versatile disk—rewritable (DVD-RW, DVD+RW), magnetic tape, non-volatile memory card, and read-only memory (ROM). Alternatively, the program codes can be downloaded from the server computer over a communication network.

The embodiments described above are preferred embodiments of the present invention, but are not used to limit the scope of protection of the present invention. Any modification, equivalent replacement, and improvement within the spirit and principle of the present invention should fall within the scope of protection of the present invention.

The invention claimed is:

1. A method for processing frequency converter monitoring data, the method comprising:
   storing an autorun file and a script file in a secure digital card connected to a secure digital card interface of a frequency converter or in a multimedia card connected to a multimedia card interface of the frequency converter, the autorun file including an invoking function for the script file;
   acquiring, by automatically running the autorun file, the script file from the secure digital card or the multimedia card based on the invoking function, the script file including a monitoring parameter specifying field and a storage location, the storage location being in the secure digital card or in the multimedia card;

parsing the script file to acquire the storage location and the monitoring parameter specifying field;

determining a monitoring parameter specified by the monitoring parameter specifying field;

collecting, from the frequency converter, frequency converter monitoring data corresponding to the monitoring parameter; and storing the frequency converter monitoring data in the storage location.

2. The method of claim 1, wherein the script file further includes a storage file format;

the method further includes parsing the script file to acquire the storage file format; and the storing the frequency converter monitoring data in the storage location includes creating a storage file corresponding to the storage file format in the storage location, and writing the frequency converter monitoring data in the storage file.

3. The method of claim 2, wherein the storage file format is a comma-separated values file format or text file format.

4. The method of claim 1, wherein the monitoring parameter specifying field includes a monitoring parameter identifier, and the determining of the monitoring parameter specified by the monitoring parameter specifying field includes determining a corresponding monitoring parameter of the monitoring parameter identifier as the monitoring parameter specified by the monitoring parameter specifying field; or the monitoring parameter specifying field includes a frequency converter storage address interval, and the determining of the monitoring parameter specified by the monitoring parameter specifying field includes determining the monitoring parameter in the frequency converter storage address interval as the monitoring parameter specified by the monitoring parameter specifying field.

5. The method of claim 1, further comprising:

setting a start triggering condition and an end triggering condition, wherein the parsing parses the script file when the start triggering condition is satisfied; and stopping storing of the frequency converter monitoring data in the storage location when the end triggering condition is satisfied.

6. A device for processing frequency converter monitoring data, the device comprising:

one or more processors; and a memory storing computer-executable instructions that, when executed by the one or more processors, cause the device to store an autorun file and a script file in a secure digital card connected to a secure digital card interface of a frequency converter or in a multimedia card connected to a multimedia card interface of the frequency converter, the autorun file including an invoking function for the script file, run the autorun file and acquire the script file from the secure digital card or the multimedia card based on the invoking function, the script file including a monitoring parameter specifying field and a storage location, the storage location being in the secure digital card or in the multimedia card, parse the script file to acquire the storage location and the monitoring parameter specifying field, determine a monitoring parameter specified by the monitoring parameter specifying field, collect, from the frequency converter, frequency converter monitoring data corresponding to the monitoring parameter, and store the frequency converter monitoring data in the storage location.

7. The device of claim 6, wherein the script file further includes a storage file format; and the computer-executable instructions, when executed by the one or more processors, cause the device to parse the script file to acquire the storage file format, create a storage file corresponding to the storage file format in the storage location, and write the frequency converter monitoring data in the storage file.

8. The device of claim 7, wherein the storage file format is a comma-separated values file format or text file format.

9. The device of claim 6, wherein the monitoring parameter specifying field includes a monitoring parameter identifier, and the computer-executable instructions, when executed by the one or more processors, cause the device to parse the script file to determine a corresponding monitoring parameter of the monitoring parameter identifier as the monitoring parameter specified by the monitoring parameter specifying field; or the monitoring parameter specifying field includes a frequency converter storage address interval, and the computer-executable instructions, when executed by the one or more processors, cause the device to parse the script file to determine the monitoring parameter in the frequency converter storage address interval as the monitoring parameter specified by the monitoring parameter specifying field.

10. The device of claim 6, wherein the computer-executable instructions, when executed by the one or more processors, cause the device to set a start triggering condition and an end triggering condition, parse the script file when the start triggering condition is satisfied, and stop storing the frequency converter monitoring data in the storage location when the end triggering condition is satisfied.

11. A device for processing frequency converter monitoring data, the device comprising:

a processor; and a memory, wherein applications, executable by the processor to enable the processor to perform the method of claim 1, are stored in the memory.

12. A non-transitory machine readable medium storing executable instructions that, when executed by a processor, cause the processor to perform the method of claim 1.

13. A device for processing frequency converter monitoring data, the device comprising:

a processor; and a memory, wherein applications, executable by the processor to enable the processor to perform the method of claim 2, are stored in the memory.

14. A non-transitory machine readable medium storing executable instructions that, when executed by a processor, cause the processor to perform the method of claim 2.

15. A device for processing frequency converter monitoring data, the device comprising:
one or more processors; and
a memory storing computer-executable instructions that, when executed by the one or more processors, cause the device to
acquire a script file, the script file including a monitoring parameter specifying field and a storage location, the monitor parameter specifying field including a monitoring parameter identifier or a frequency converter storage address interval,
parse the script file to acquire the storage location and the monitoring parameter specifying field,
determine a monitoring parameter specified by the monitoring parameter specifying field, wherein
the monitoring parameter specifying field includes a monitoring parameter identifier, and the computer-executable instructions, when executed by the one or more processors, cause the device to
parse the script file to determine a corresponding monitoring parameter of the monitoring parameter identifier as the monitoring parameter specified by the monitoring parameter specifying field, or
the monitoring parameter specifying field includes a frequency converter storage address interval, and the computer-executable instructions, when executed by the one or more processors, cause the device to parse the script file to determine the monitoring parameter in the frequency converter storage address interval as the monitoring parameter specified by the monitoring parameter specifying field,
collect, from a frequency converter, frequency converter monitoring data corresponding to the monitoring parameter, and
store the frequency converter monitoring data in the storage location.

* * * * *